(12) United States Patent
Natkin

(10) Patent No.: US 7,278,407 B2
(45) Date of Patent: Oct. 9, 2007

(54) BOOST CONTROL FOR INTERNAL COMBUSTION ENGINE USING SUBSTANTIALLY CARBON-FREE FUEL

(75) Inventor: Robert Natkin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/274,702

(22) Filed: Nov. 14, 2005

(65) Prior Publication Data
US 2007/0107703 A1 May 17, 2007

(51) Int. Cl.
*F02B 43/00* (2006.01)
*F02B 33/00* (2006.01)
*F02D 23/00* (2006.01)

(52) U.S. Cl. ............ 123/527; 123/559.1; 60/602

(58) Field of Classification Search ............ 123/3, 123/1 A, 564, 559.1, 527
See application file for complete search history.

(56) References Cited

U.S. PATENT DOCUMENTS

| | | | |
|---|---|---|---|
| 5,025,629 A * | 6/1991 | Woollenweber | 60/600 |
| 5,392,740 A | 2/1995 | Teramoto et al. | |
| 5,413,075 A | 5/1995 | Mamiya et al. | |
| 5,746,172 A * | 5/1998 | Peschka et al. | 123/292 |
| 6,655,324 B2 * | 12/2003 | Cohn et al. | 123/1 A |
| 6,748,934 B2 * | 6/2004 | Natkin et al. | 123/563 |
| 6,779,337 B2 | 8/2004 | Tang et al. | |
| 2004/0065274 A1 | 4/2004 | Cohn et al. | |

FOREIGN PATENT DOCUMENTS

WO    WO 2004060708 A1 *    7/2004

* cited by examiner

Primary Examiner—Stephen K. Cronin
Assistant Examiner—Hyder Ali
(74) Attorney, Agent, or Firm—Allan J. Lippa; Alleman Hall McCoy Russell & Tuttle LLP

(57) ABSTRACT

A system and method for limiting HC, CO, $CO_2$, and $NO_x$ emissions in an internal combustion engine is provided. According to one aspect of the disclosure, a substantially carbon-free fuel, such as hydrogen ($H_2$), is used to fuel combustion in an internal combustion engine. The internal combustion engine is operated, at least some of the time, at an equivalence ratio less than 1 and a boost pressure ratio greater than 1.

18 Claims, 3 Drawing Sheets

BOOST CONTROL FOR INTERNAL COMBUSTION ENGINE USING SUBSTANTIALLY CARBON-FREE FUEL

FIELD

The present disclosure is directed toward a system and method for limiting exhaust emissions while maintaining power output and fuel energy efficiency in an internal combustion engine.

BACKGROUND AND SUMMARY

Internal combustion engines convert chemical energy in a fuel to mechanical energy. As part of the conversion, the fuel can be combusted, thus causing hot combustion products to expand within the engine. The expansion of the combustion products can be used to move mechanical components of the engine, such as pistons. Combustion reactions can have several products, or emissions, some of which can be undesirable. For example, when hydrocarbons are used as fuel, combustion products can include HC, CO, $CO_2$ and $NO_x$.

In an attempt to reduce emissions, efforts have been made to utilize substantially carbon-free hydrogen as a combustion fuel instead of hydrocarbons. When hydrogen ($H_2$) is used as the fuel, there is not a substantial amount of HC, CO, or $CO_2$ emissions, because the fuel does not include carbon that can be turned into HC, CO, or $CO_2$. The carbon based emissions that can exist come from the small amount of oil consumed during engine operation.

The inventor herein has recognized that several issues are raised by using substantially carbon-free hydrogen as a combustion fuel. In particular, while hydrogen fueled engines have low levels of HC, CO, and $CO_2$ emissions, thus far, hydrogen engines have proven to have significant levels of $NO_x$ emissions. If a hydrogen fueled engine is operated at stoichiometry (34.2:1) in a port fuel injected, naturally aspirated engine configuration, $NO_x$ engine emissions can range from about 8500 ppm to about 10000 ppm, which is about 2.5 to 3 times the amount of a gasoline engine. Under such conditions, the engine is also very susceptible to auto-ignition and the performance level will be reduced by about 14% compared to a comparable spark-ignited gasoline engine.

While the inventor herein has recognized that operating a substantially carbon-free engine in a lean condition can reduce $NO_x$ emissions, the inventor has also recognized that running such an engine lean can make it difficult to achieve comparable power output. In an attempt to compensate for decreased power output in internal combustion engines, attempts have been made to increase engine displacement. However, such an approach can increase the weight of the engine, which can adversely affect vehicle fuel efficiency.

At least some of the issues associated with using substantially carbon-free fuel may be addressed by combusting a substantially carbon-free fuel at an equivalence ratio less than 1, while boosting intake air pressure. In this way, it may be possible to limit HC, CO, $CO_2$, and/or $NO_x$ emissions, while maintaining satisfactory power output and vehicle fuel efficiency.

DETAILED DESCRIPTION

The present disclosure relates to a strategy for controlling boost in an internal combustion engine configured to use a substantially carbon-free fuel (such engines are herein referred to as substantially carbon-free engines). Hydrogen ($H_2$) may be used as a substantially carbon-free fuel in accordance with this disclosure, although that is not required.

Figure 1:
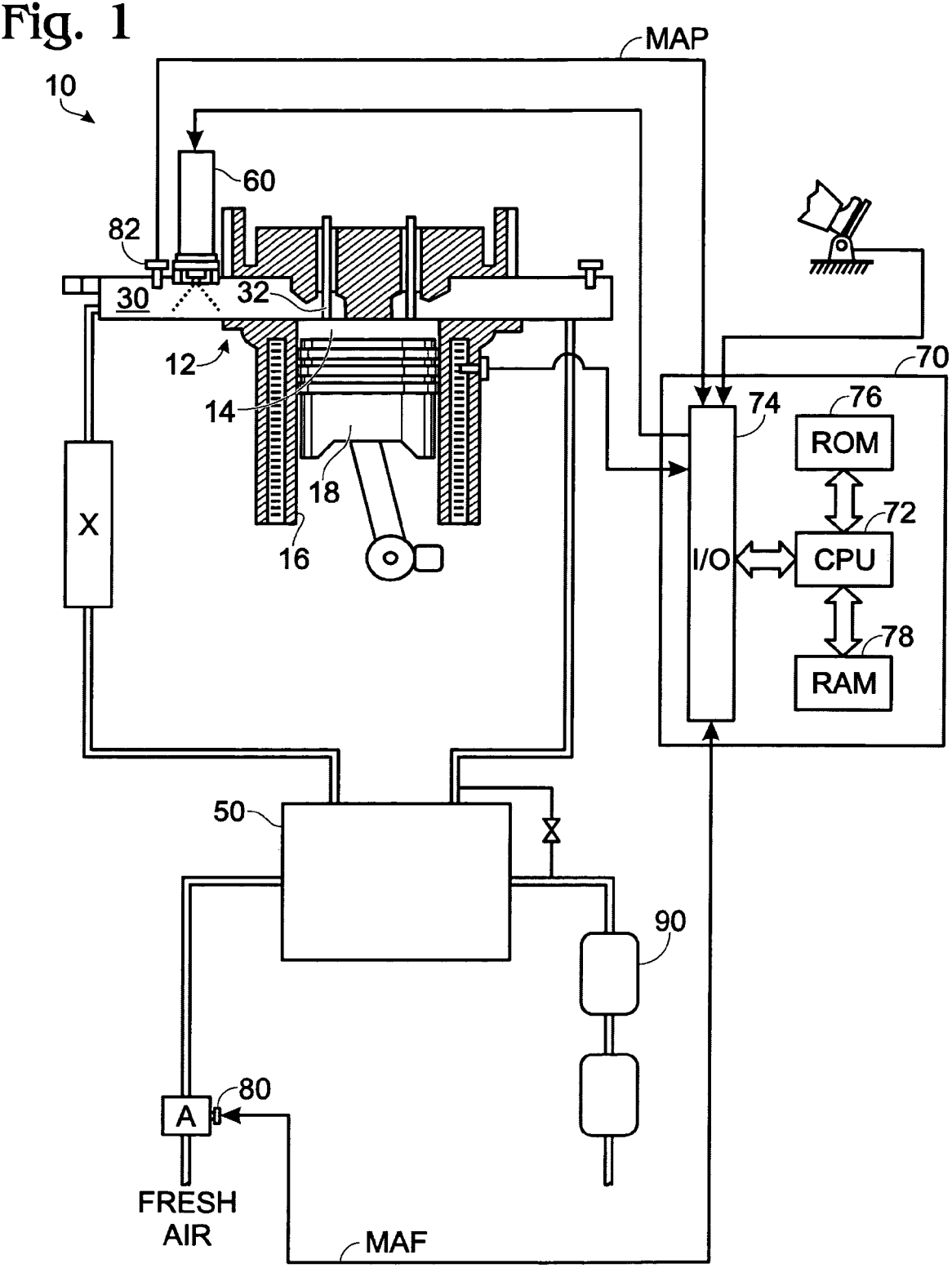
FIG. 1 schematically shows a hydrogen fueled internal combustion engine including a booster.

FIG. 1 schematically shows an internal combustion engine 10 that is configured to convert substantially carbon-free fuel into mechanical energy. Engine 10 may include one or more cylinders, one of which is illustrated at 12. Cylinder 12 includes a combustion chamber 14 at least partially defined by cylinder walls 16 and a moveable piston 18.

Combustion chamber 14 is in fluid communicates with an air intake manifold 30 via intake valve 32. The air intake manifold can be used to deliver air, including oxygen ($O_2$), to the combustion chamber for combustion. The intake valve can be controlled so that a desired flow of air enters the combustion chamber at a desired time, while at the same time preventing undesired backflow. Engine 10 can include a booster 50, which can be used to increase the pressure of air delivered to the combustion chamber, thereby increasing the relative mass of $O_2$ available for combustion. In some embodiments, the booster can include a supercharger and in some embodiments the booster can include a turbocharger.

Various types of boosting devices may be used in which the amount of intake air compression and/or gas expansion can be variably controlled during engine operation. For example, a turbocharger including a wastegate may be used. In another example, a variable geometry turbocharger may be used. In still another example, a variable clutch may be used to control an amount of supercharging.

As used herein, the term "boost ratio" is used to describe the ratio $$\left(\frac{P_L}{P_{VE}}\right)$$

of a pressure downstream of the booster ($P_L$) to a pressure upstream of the booster ($P_{VE}$).

Engine 10 can include a mechanism for delivering substantially carbon-free fuel to the combustion chamber. In the illustrated embodiment, engine 10 includes an electronically-controlled fuel injector 60 positioned for delivering substantially carbon-free fuel to the combustion chamber via the intake manifold. A particular cylinder can include additional or alternative mechanisms for delivering substantially carbon-free fuel to the combustion chamber. In some embodiments, one or more fuel injectors can be positioned to deliver fuel directly to the combustion chamber, and in some embodiments, one or more fuel injectors can be positioned to deliver fuel to an intake manifold or to another location. Furthermore, in some embodiments, a mechanism other than an electronically controlled fuel injector can be used to deliver fuel to the combustion chamber. When a fuel injector is used, it can be configured to receive a pulse-width-modulated signal, which can control the ejection of fuel from the fuel injector.

Engine 10 can include a controller 70. In some embodiments, the controller can include a processor 72, input/output ports 74, electronically programmable memory 76, random access memory 78, and/or other components. Controller 70 can be configured to receive various signals from sensors coupled to engine 10 via ports 74. Such received signals can include, but are not limited to: measurements of inducted mass air flow (MAF) from a mass air flow sensor 80; and measurement of manifold pressure (MAP) from a manifold pressure sensor 82.

Controller 70 can be used to control intake valve 32, fuel injector 60, booster 50, and/or a variety of other engine components. Of particular importance for the present disclosure, the controller can be used to control the air to fuel ratio and the boost pressure ratio during engine operation. In particular, the controller can be used to control the air to fuel ratio and the boost pressure ratio so as to decrease $NO_x$ emissions, while at the same time, maintaining satisfactory power output.

Engine 10 can also include one or more exhaust gas treatment devices configured to further limit undesired tailpipe emissions. For example, engine 10 can include a lean $NO_x$ trap 90 configured to absorb feedgass $NO_x$. As illustrated, the $NO_x$ trap is downstream of booster 50. In some embodiments, the $NO_x$ trap can be upstream of booster 50. In some embodiments, the lean $NO_x$ trap can be purged with on-board $H_2$. As a nonlimiting example, 0.5 grams of $H_2$ can be used to reduce/purge a 2 liter trap about every 15 miles. Additional or alternative exhaust gas treatment devices may be used while remaining within the scope of this disclosure.

Figure 2:
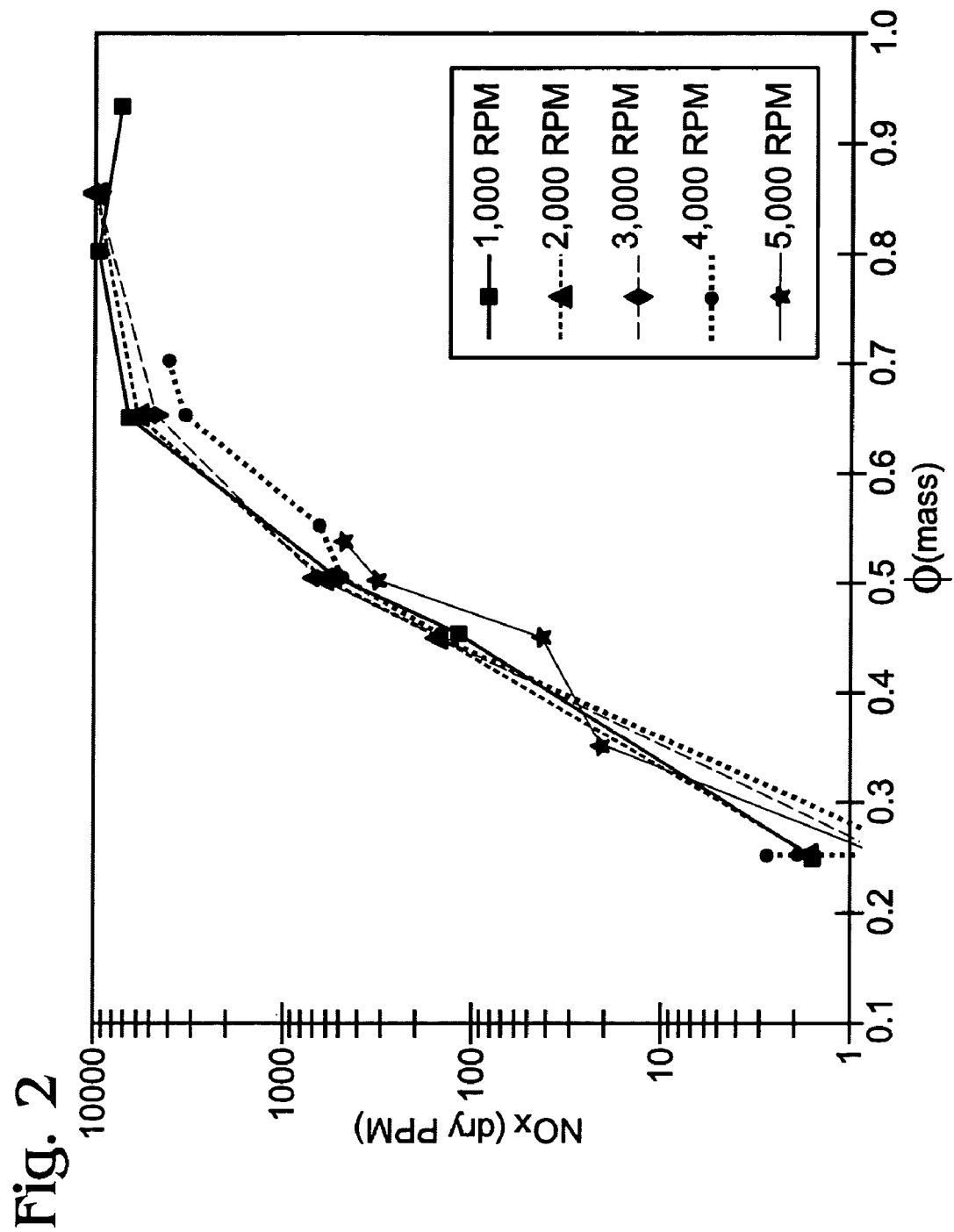
FIG. 2 is a plot showing a relationship between equivalence ratio and NOx emissions for a hydrogen fueled internal combustion engine.

FIG. 2 is a plot showing a relationship between $NO_x$ emissions and an equivalence ratio ϕ for a hydrogen fueled internal combustion engine operating at 1000, 2000, 3000, 4000, and 5000 revolutions per minute. The data was acquired by running a supercharger with boost levels proportional to engine rpm and a max boost of 1.85 bar. As used herein, the equivalence ratio ϕ is the actual fuel to air ratio over the stoichiometric fuel to air ratio:

$$\phi = \frac{(F/A)_A}{(F/A)_S}.$$

An equivalence ratio ϕ less than 1 corresponds to a lean condition while an equivalence ratio greater than 1 corresponds to a rich condition. An equivalence ratio equal to 1 corresponds to en engine operating at stoichiometry.

As can be seen in FIG. 2, there is a direct relationship between $NO_x$ emissions and equivalence ratio, with larger equivalence ratios generating higher $NO_x$ emissions. As equivalence ration exceeds 048-0.52, the peak combustion temperatures can increase above 2200K, and $NO_x$ production can rise rapidly.

The following table shows $NO_x$ emissions for fixed engine speeds and varying loads.

| Speed (RPM) | Tq | ϕ_mass | ϕ_chem | $NO_x$ (PPM) |
|---|---|---|---|---|
| 1000 | 5.3 | 0.250 | 0.246 | 2 |
| 1000 | 57.0 | 0.250 | 0.243 | 0 |
| 1000 | 113.7 | 0.450 | 0.438 | 116 |
| 1000 | 130.0 | 0.504 | 0.490 | 524 |
| 1000 | 151.6 | 0.648 | 0.618 | 6894 |
| 1000 | 172.2 | 0.802 | 0.758 | 10158 |
| 1000 | 187.1 | 0.932 | 0.885 | 7379 |
| 2000 | 5.9 | 0.253 | 0.243 | 2 |
| 2000 | 73.8 | 0.251 | 0.244 | 2 |
| 2000 | 155.8 | 0.453 | 0.441 | 134 |
| 2000 | 181.0 | 0.504 | 0.490 | 660 |
| 2000 | 216.0 | 0.651 | 0.624 | 6194 |
| 2000 | 261.6 | 0.852 | 0.812 | 10044 |
| 3000 | 4.9 | 0.247 | 0.246 | 1 |
| 3000 | 72.5 | 0.251 | 0.251 | 1 |
| 3000 | 161.8 | 0.449 | 0.443 | 154 |
| 3000 | 180.1 | 0.502 | 0.490 | 679 |
| 3000 | 232.9 | 0.651 | 0.632 | 4920 |
| 3001 | 281.1 | 0.854 | 0.819 | 10029 |
| 4000 | 6.5 | 0.251 | 0.249 | 2 |
| 4000 | 61.1 | 0.250 | 0.249 | 3 |
| 4000 | 62.7 | 0.250 | 0.255 | 0 |
| 4000 | 157.0 | 0.451 | 0.449 | 148 |
| 4000 | 176.0 | 0.503 | 0.499 | 490 |
| 4000 | 191.2 | 0.551 | 0.545 | 671 |
| 4000 | 225.1 | 0.652 | 0.632 | 3439 |
| 4000 | 227.6 | 0.700 | 0.680 | 4202 |
| 5000 | 6.3 | 0.252 | 0.251 | 0 |
| 5000 | 48.0 | 0.250 | 0.250 | 1 |
| 5000 | 97.6 | 0.351 | 0.351 | 21 |
| 5000 | 122.1 | 0.450 | 0.448 | 43 |
| 5000 | 161.3 | 0.499 | 0.500 | 329 |
| 5000 | 167.3 | 0.537 | 0.530 | 482 |

FIG. 2 and the above table show that $NO_x$ is primarily a function of ϕ (or ϕ required for a specific load) and not of RPM. Therefore, by restricting the max ϕ, feedgas $NO_x$ can be limited independent of engine speed. As described below, to increase engine output, boost can be increased, thus increasing power output without significantly increasing feedgas $NO_x$ output.

The information from FIG. 2, the above table, and/or similar data can be used to determined and equivalence ration that yields an acceptable level of $NO_x$ emissions. For example, it can be seen that an equivalence ratio of about 0.4 results in about 30-40 parts-per-million $NO_x$ emissions. As another example, an equivalence ratio of about 0.55 results in about 600-1500 parts-per-million $NO_x$ emissions. As still another example, an equivalence ratio of about 0.3 results in about 1-4 parts-per-million $NO_x$ emissions. It can be appreciated that relatively low equivalence ratios can result in low $NO_x$ emissions.

A lean $NO_x$ trap can be used to further reduce $NO_x$ emissions. For example, a lean $NO_x$ trap with an absorption rate of about 90% can be used to reduce $NO_x$ emissions of about 30-40 parts-per-million to about 3-4 parts-per-million. An acceptable tailpipe emission level can be achieved by selecting an equivalence ratio that yields a feedgas NOx level that can be managed by the lean NOx trap, and/or other exhaust gas treatment devices. For example, the super ultra low emission vehicles (SULEV) standards requires NOx emissions be less than 5 parts-per-million. If a lean $NO_x$ trap with an absorption rate of 90% is used, feedgas NOx levels should be no higher than about 50 parts-per-million, and therefore, according to FIG. 2, equivalence ratio should be no higher than about 0.425.

The data contained in FIG. 2 and the above table is representative of example substantially carbonless engines.

Different engines can have different relationships between equivalence ratio and NOx emission, and such relationships can be used to determine an equivalence ratio that will yield a desired $NO_x$ emission level for such engines.

If a substantially carbonless engine is operated at an equivalence ratio less than 1, the engine may not generate as much power as if the same engine was operated at a higher equivalence ratio (assuming other engine operating parameters do not change). In order to compensate for decreased power, an engine with a larger displacement can be used. However, such an approach can adversely affect vehicle fuel efficiency.

The boost ratio may be increased to mitigate power loss resulting from relatively low equivalence ratios. The boost ratio can be increased by using a supercharger, turbocharger, and/or other device capable of increasing charge pressure. The inventor herein has discovered that while there is a significant correlation between equivalence ratio and $NO_x$ emissions, increasing the boost pressure ratio has a much less significant affect on $NO_x$ emissions. In some configurations, increasing boost pressure may have little to no affect on $NO_x$ emissions.

It should be understood that in addition to limiting $NO_x$ emissions, there may be various other reasons for operating at a particular equivalence ratio. It is within the scope of this disclosure to select a boost pressure ratio based at least in part on a corresponding equivalence ratio, no matter the reason for choosing the particular equivalence ratio.

Figure 3:
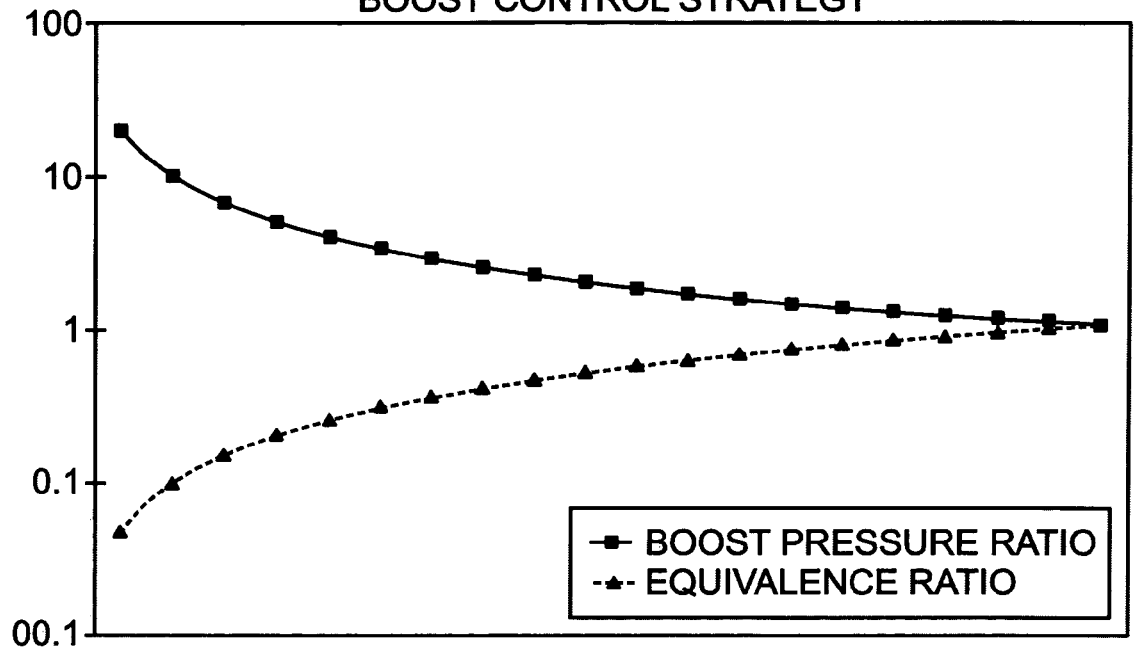
FIG. 3 is a plot showing an inverse relationship between a boost pressure ratio and an equivalence ratio.

As shown in FIG. 3, in some embodiments, the boost ratio can be controlled to be inversely proportionate to the equivalence ratio.

$$\left(\frac{P_L}{P_{VE}}\right) \propto \phi^{-1}$$

The relationship shown in FIG. 3, or another suitable relationship, can be used to determine what boost pressure ratio will be used for a particular equivalence ratio. For example, a particular equivalence ratio can be selected based on any number of different criteria, including but not limited to, limiting $NO_x$ emissions. After a particular equivalence ratio is selected, a boost pressure ratio can be selected based on an inversely proportionate relationship or another suitable relationship and the inlet charge pressure can be controlled to achieve the selected boost pressure ratio.

In some embodiments, an equivalence ratio can be changed during engine operation, and the boost pressure ratio can be changed according to a predetermined relationship with the equivalence ratio (such as the inversely proportionate relationship shown in FIG. 3). Boost can be used in combination with varying φ to limit the $NO_x$ output. In some embodiments, a variable boost as well as a limited but variable φ can be used to give gasoline like performance with very low feedgas NOx. For example, when increasing the boost pressure ratio, the equivalence ratio can be decreased. By using varied equivalence ratio and/or boost pressure ratio, performance similar to (or better than) a gasoline engine can be achieved with an engine configured to use a substantially carbonless fuel, such as hydrogen. In particular, power output and fuel efficiency at least on par with a carbon burning engine can be achieved, while generating ultra low $CO_2$ and $NO_x$ emissions. For example, to get approximately the same power output as a gasoline engine without the high feedgas $NO_x$, an $H_2$ ICE max φ can be restricted to about 0.45 and run with a boost ratio of 2.2 bar ( or 32.66 psi absolute, or 18 psi gauge). To compensate for the power needed to run the boost system, the boost ratio may be raised further.

A boost pressure ratio can be selected based, at least in part, on an equivalence ratio according to a variety of different relationships. The inversely proportional relationship illustrated in FIG. 3 is provided as one nonlimiting example. Other inversely proportional relationships, as well as other relationships that are not inversely proportional, can also be used to select a boost pressure ratio based on an equivalence ratio.

Figure 4:
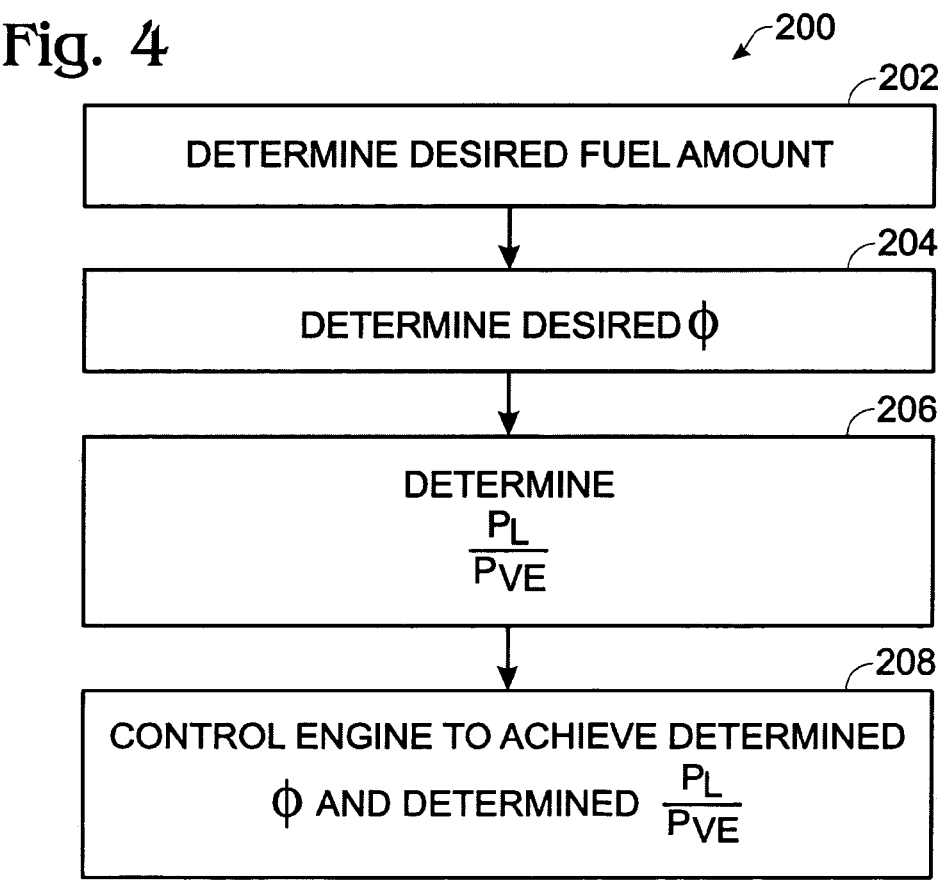
FIG. 4 is a flow chart showing an example method of controlling boost and equivalence ratio in a substantially carbon-free internal combustion engine.

FIG. 4 shows a nonlimiting example of a method 200 for implementing a boost control strategy in which during at least some engine operating conditions, the equivalence ratio is controlled to be less than 1 and the boost pressure ratio is controlled to be greater than 1. At 202, method 200 includes determining a desired fuel amount, which can correspond to a desired amount of power and/or torque. In some embodiments, a desired fuel amount can be determined at least in part by considering pedal position and/or vehicle speed. At, 204, method 200 also includes determining a desired equivalence ratio. Equivalence ratio can be determined based on the desired amount of fuel, emission levels, and/or other operating parameters of the engine. Upon determining a desired equivalence ratio, a boost pressure ratio is determined at 206. The boost pressure ratio can be selected so as to achieve a desired power output for a particular equivalence ratio. As described above, in some embodiments, a boost pressure ratio may be selected to be inversely proportionate to the equivalence ratio. At 208, the engine is controlled to achieve the determined equivalence ratio and boost pressure ratio. In some embodiments, this may be accomplished by controlling one or more of a fuel injector, intake air valve, booster, and/or other engine components. In some embodiments, one or more of the controlled components can be electronically controlled, such as by signals controlled by a processor.

It should be understood that other parameters can affect a desired equivalence ratio and/or amount of boosting. For example, boost may be adjusted based on cam timing, throttle position (if present), engine temperature, catalyst temperature, and others.

As described above, substantially carbon-free fuel can produce fewer harmful emissions than many other fuels. Furthermore, as explained above, when using substantially carbon-free fuel in a manner that generates very low $NO_x$ emissions, compromises in power output can be mitigated if not eliminated altogether. As a nonlimitting example, $H_2$ has approximately 3.5 Joules per gram of air burned at stoichiometry (i.e., 34.2:1), whereas gasoline has approximately 2.9 Joules per gram of air burned at stoichiometry (i.e., 14.7:1 for gasoline). Therefore, $H_2$ has approximately 21% higher energy content per gram of combusted air relative to gasoline if both fuels are burned at stoichiometry. When running an $H_2$ internal combustion engine at an equivalence ratio of 0.45 and a boost ratio of 2.22, for example, the $H_2$ fuel energy will be approximately the same as if operating at stoichiometry. However, the power will be 1.21 times that of a comparable gasoline engine (running at stoichiometry) if boost device and friction losses are not considered. As described above, this can be accomplished while keeping $NO_x$ emissions very low. As a nonlimiting example, a 6.8L engine has been run with 0.45 phi and 2.2 bar boost to produce only 20-30 ppm $NO_x$.

While the above examples describe operation purely with hydrogen fuel, the above approach can be combined with an engine that operates on a plurality of fuels, including a combination of gasoline and hydrogen. In some embodiments, the engine may operate on a first fuel during a first condition, and a second fuel during a second condition.

The invention claimed is:

1. A hydrogen-fueled internal combustion engine, comprising:
   at least one cylinder;
   a hydrogen deliverer configured to supply the at least one cylinder with at least substantially carbon-free hydrogen;
   an air deliverer configured to supply at least oxygen to the at least one cylinder at a controllable boost pressure; and
   an electronic control system controlling at least hydrogen delivery, oxygen delivery, and boost pressure such that during at least one condition, a boost pressure ratio is inversely proportionate to an equivalence ratio having an actual fuel to air ratio as its numerator and a stoichiometric fuel to air ratio as its denominator.

2. The hydrogen-fueled internal combustion engine of claim 1, wherein the air deliverer includes a turbocharger.

3. The hydrogen-fueled internal combustion engine of claim 1, wherein the air deliverer includes a supercharger.

4. The hydrogen-fueled internal combustion engine of claim 1, further comprising a lean NOx trap configured to absorb feedgass NOx.

5. A vehicle comprising the hydrogen-fueled internal combustion engine of claim 1.

6. A method of decreasing HC, CO, CO2, and NOx emissions in an internal combustion engine, comprising:
   combusting a substantially carbon-free fuel at an equivalence ratio less than 1, the equivalence ratio having an actual fuel to air ratio as its numerator and a stoichiometric fuel to air ratio as its denominator; and
   boosting intake-air pressure while combusting the carbon-free fuel at the equivalence ratio less than 1, where a relative amount of boosting is selected based on the equivalence ratio.

7. The method of claim 6, wherein intake-air pressure is boosted so that a boost pressure ratio is inversely proportionate to the equivalence ratio.

8. The method of claim 6, wherein the equivalence ratio is between about 0.2 and about 0.5.

9. The method of claim 8, wherein intake-air pressure is boosted such that a boost pressure ratio is between about 2 and about 5.

10. The method of claim 6, wherein the equivalence ratio is between about 0.25 and about 0.4.

11. The method of claim 10, wherein intake-air pressure is boosted such that a boost pressure ratio is between about 2.5 and about 4.

12. The method of claim 6, wherein boosting intake-air pressure includes using a turbocharger to boost intake air pressure.

13. The method of claim 6, wherein boosting intake-air pressure includes using a supercharger to boost intake air pressure.

14. The method of claim 6, further comprising absorbing feedgas NOx.

15. The method of claim 6, wherein the at least substantially carbon-free fuel is hydrogen.

16. A vehicle configured to execute the method of claim 6.

17. A method of decreasing HC, CO, CO2, and NOx emissions in an internal combustion engine, comprising:
   combusting substantially carbon-free hydrogen fuel at an equivalence ratio less than 1, the equivalence ratio having an actual fuel to air ratio as its numerator and a stoichiometric fuel to air ratio as its denominator;
   boosting intake-air pressure by an amount inversely proportionate to the equivalence ratio.

18. A vehicle configured to execute the method of claim 17.

* * * * *